United States Patent Office 3,169,136
Patented Feb. 9, 1965

3,169,136
2β-HALO-17α-ALKENYL-19-NOR-
ANDROSTANE-3α,17β-DIOLS
Albert Bowers and John Edwards, Mexico City, Mexico,
assignors, by mesne assignments, to Syntex Corporation, a corporation of Panama
No Drawing. Filed Feb. 14, 1962, Ser. No. 173,135
3 Claims. (Cl. 260—397.5)

The present invention relates to novel cyclopentanophenanthrene derivatives and to a process for the production thereof.

More particlarly the present invention relates to novel 2β-halo-androstan-3α-ol derivatives.

The novel compounds of the present invention are represented by the following formulas:

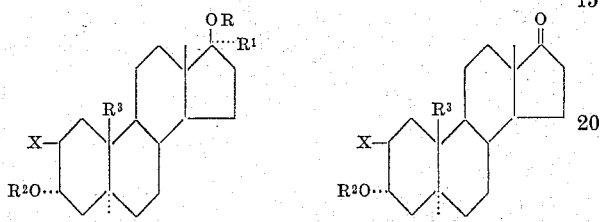

In the above formulas R and R² represent a hydrogen atom or a hydrocarbon carboxylic acyl group containing less than 12 carbon atoms; R¹ represents hydrogen, lower alkyl, lower alkenyl or lower alkynyl; R³ represents hydrogen or methyl and X represents a halogen atom.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are anabolic-androgenic substances with a favorable anabolic-androgenic ratio, and exhibit anti-estrogenic and anti-gonadotrophic activities. In addition, these compounds possess useful blood cholesterol lowering and anti-fibrillatory properties, and inhibit the action of the pituitary gland.

The novel compounds, objects of this invention, may be produced by the process illustrated by the following equation:

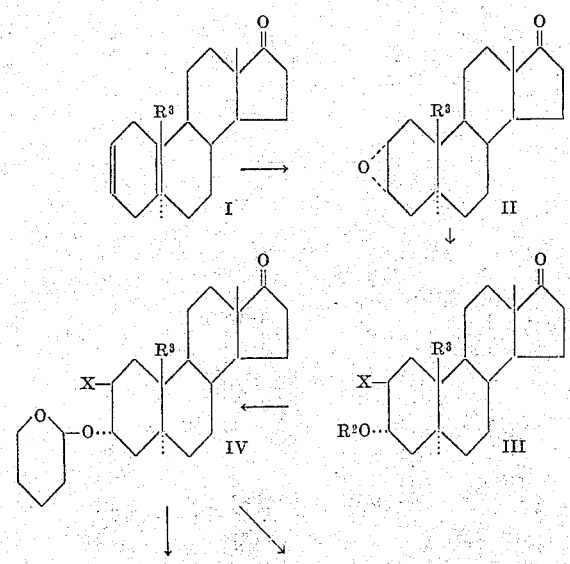

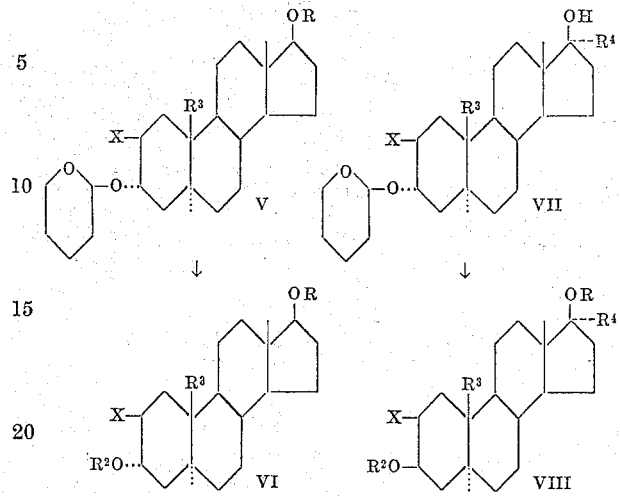

In the above formulas R, R², R³ and X have the same meaning as hereinbefore set forth and R⁴ represents lower alkyl, lower alkenyl or lower alkynyl.

In practicing the above outlined process the starting Δ²-androsten-17-one or 19-nor derivative thereof (I) is treated with an organic peracid, preferably monoperphthalic acid, to produce 2α,3α-oxido-androstan-17-one or the 19-nor derivative thereof (II). Opening of the epoxide ring of the latter compounds with a hydrogen halide in a suitable solvent, is productive of the corresponding 2-halo-androstan-3α-ol-17-one compounds (III: R²=H) which upon conventional reaction with dihydropyrane in the presence of an acid, such as p-toluene sulfonic acid in an inert solvent, preferably benzene, yield the respective 3-tetrahydropyranyl ether derivative (IV). Reduction of the 17-keto group of the latter compound e.g., with sodium borohydride, furnishes the corresponding 17β-hydroxy derivative (V: R=H) which upon a conventional acylation followed by acid hydrolysis yields the 17β-acyloxy-3α-hydroxyl compound (VI: R=acyl; R²=H). Basic hydrolysis or double metal hydride reduction is productive of the 3α,17β-free diol (VI: R=R²=H).

The 17-keto compounds represented by formula (IV), when treated with lower alkyl, lower alkenyl or lower alkynyl magnesium halide, e.g., methyl magnesium bromide, vinyl magnesium bromide, or ethynyl magnesium bromide, yields the respective 17α-lower (alkyl, alkenyl or alkynyl)-17β-hydroxy derivatives (VII). Conventional acylation in the presence of p-toluene sulfonic acid is productive of the 3α,17β-di-acylates (VIII: R=R²=acyl) which upon mild alkaline hydrolysis give the 3α-free alcohols (VIII: R=acyl; R²=H). Reduction with lithium aluminum hydride affords the corresponding 3α,17β-free-diols (VIII: R=R²=H).

The compounds described hereinbefore having one or two secondary hydroxyl groups present in the molecule (III, V, VI, VIII: R=R²=H) are conventionally esterified with an acylating agent, as for example an anhydride of a hydrocarbon carboxylic acid of the above described type, in pyridine, to give the corresponding acylates (III, V, VI: R=R²=acyl) (VIII: R=H; R²=acyl).

The tertiary hydroxyl of the 17α-substituted 17β-alcohols (VIII: R=H) is conventionally acylated in the presence of p-toluenesulfonic acid, with an acylating agent to give the corresponding 17α-substituted -17β-acylate (VIII: R=acyl). The acyl group at C–17 may be the same as or different to the acyl group at C–3.

The following specific examples serve to illustrate, but are not intended to limit the present invention:

*Example I*

A solution of 2.5 g. of Δ²-androsten-17-one (Hirschmann. J. Biol. Chem. 136, 448, (1944)) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 2α,3α-oxido-androstan-17-one.

By the same procedure 19-nor-Δ²-androsten-17-one (Bowers et al. U.S. p. appl. Ser. No. 128,361, filed August 1, 1961) was converted into: 2α,3α-oxido-19-nor-androstan-17-one.

*Example II*

In a polyethylene flask, adapted with magnetic stirrer, there was dissolved 1.8 g. of 2α,3α-oxido-androstan-17-one in 30 cc. of methylene chloride, the solution was cooled to 0° C. and a solution of 2.11 g. of anhydrous hydrogen fluoride in 3.7 cc. of tetrahydrofurane cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 2β-fluoro-androstan-3α-ol-17-one.

When applying the above procedure to 2α,3α-oxido-19-nor-androstan-17-one, there was obtained 2β-fluoro-19-nor-androstan-3α-ol-17-one.

*Example III*

To a solution of 4 g. of 2α,3α-oxido-androstan-17-one, in 40 cc. of anhydrous chloroform, was added, over a period of 35 minutes, 30 cc. of a 0.45 N solution of dry hydrogen chloride in chloroform, under continuous stirring and maintained the temperature arount 0° C. The mixture was then stirred at 0° C. for 8 hours further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 2β-chloro-androstan-3α-ol-17-one.

2α,3α-oxido-19-nor-androstan-17-one was treated following the above procedure, to give 2β-chloro-19-nor-androstan-3α-ol-17-one.

*Example IV*

2α,3α-oxido androstan-17-one and 2α,3α-oxido-19-nor-androstan-17-one were treated following the procedure described in the foregoing example, except that hydrochloric acid was substituted by hydrobromic acid, thus yielding respectively 2β - bromo-androstan-3α-ol-17-one and 2β-bromo-19-nor-androstan-3α-ol-17-one.

*Example V*

A mixture of 2 g. of 2α,3α-oxido-androstan-17-one, 2 cc. of hydriodic acid and 50 cc. of anhydrous methanol was refluxed for 3 hours. It was then cooled and poured into water. The resulting precipitate was filtered off, washed with water and dried. Recrystallization from methylene chloride-hexane furnished 2β-iodo-androstan-3α-ol-17-one.

By the same procedure was treated 2α,3α-oxido-19-nor-androstan-17-one, thus giving 2β-iodo-19-nor-androstan-3α-ol-17-one.

*Example VI*

10 cc. of dihydropyrane were added to a solution of 5 g. of 2β-fluoro-androstan-3α-ol-17-one, in 75 cc. of benzene and about 5 cc. were distilled to remove moisture. 1.5 g. of p-toluenesulfonic acid were added to the cooled solution, which was then allowed to stand at room temperature for 4 days. The solution was washed with sodium carbonate and water, dried and evaporated. The residue was chromatographed on 75 g. of neutral alumina. Crystallization of the fractions eluted with hexane from pentane yielded the 3-tetrahydropyranylether of 2β-fluoro-androstan-3α-ol-17-one.

The starting compounds under I were treated by the foregoing procedure, thus giving the corresponding products under II.

| I | II |
|---|---|
| 2β-fluoro-19-nor-androstan-3α-ol-17-one. | The 3-tetrahydropyranylether of 2β-fluoro-19-nor-androstan-3α-ol-17-one. |
| 2β-chloro-androstan-3α-ol-17-one. | The 3-tetrahydropyranylether of 2β-chloro-androstan-3α-ol-17-one. |
| 2β-chloro-19-nor-androstan-3α-ol-17-one. | The 3-tetrahydropyranylether of 2β-chloro-19-nor-androstan-3α-ol-17-one. |
| 2β-bromo-androstan-3α-ol-17-one. | The 3-tetrahydropyranylether of 2β-bromo-androstan-3α-ol-17-one. |
| 2β-bromo-19-nor-androstan-3α-ol-17-one. | The 3-tetrahydropyranylether of 2β-bromo-19-nor-androstan-3α-ol-17-one. |
| 2β-iodo-androstan-3α-ol-17-one. | The 3-tetrahydropyranylether of 2β-iodo-androstan-3α-ol-17-one. |
| 2β-iodo-19-nor-androstan-3α-ol-17-one. | The 3-tetrahydropyranylether of 2β-iodo-19-nor-androstan-3α-ol-17-one. |

*Example VII*

A solution of 2 g. of sodium borohydride in 30 cc. of methanol was added with stirring to a solution of 2 g. of the 3-tetrahydropyranylether of 2β-fluoro-androstan-3-α-ol-17-one, in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave the 3-tetrahydropyranylether of 2β-fluoro-androstane-3α,17β-diol.

By the same procedure were treated the starting compounds listed below, to give the corresponding products hereinafter disclosed.

| Starting Compounds | Products |
|---|---|
| The 3-tetrahydropyranylether of 2β-fluoro-19-nor-androstan-3α-ol-17-one. | The 3-tetrahydropyranylether of 2β-fluoro-19-nor-androstane 3α,17β-diol. |
| The 3-tetrahydropyranylether of 2β-chloro-androstan-3α-ol-17-one. | The 3-tetrahydropyranylether of 2β-chloro-androstane-3α, 17β-diol. |
| The 3-tetrahydropyranylether of 2β-chloro-19-nor-androstan-3α-ol-17-one. | The 3-tetrahydropyranylether of 2β-chloro-19-nor-androstane-3α-17β-diol. |
| The 3-tetrahydropyranylether of 2β-bromo-androstan-3α-ol-17-one. | The 3-tetrahydropyranylether of 2β,bromo-androstane-3α, 17β-diol. |
| The 3-tetrahydropyranylether of 2β-bromo-19-nor-androstan-3α-ol-17-one. | The 3-tetrahydropyranylether of 2β-bromo-19-nor-androstane-3α,17β-diol. |
| The 3-tetrahydropyranylether of 2β-iodo-androstan-3α-ol-17-one. | The 3-tetrahydropyranylether of 2β-iodo-androstane-3α-17β-diol. |
| The 3-tetrahydropyranylether of 2β-iodo-19-nor-androstan-3α-ol-17-one. | The 3-tetrahydropyranylether of 2β-iodo-19-nor-androstane-3α-17β-diol. |

Example VIII

A solution of 5 g. of the 3-tetrahydropyranylether of 2β-fluoro-androstan-3α-ol-17-one in 250 cc. of thiophene-free benzene was treated with 27.5 cc. of 4N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded the 3-tetrahydropyranylether of 2β-fluoro-17α-methyl-androstane-3α,17β-diol.

Upon treatment by the same procedure of the starting compounds under I, there were obtained the products under II.

| I | II |
| --- | --- |
| The 3-tetrahydropyranylether of 2β-fluoro-19-nor-androstan-3α-ol-17-one. | The 3-tetrahydropyranylether of 2β-fluoro-17α-methyl-19-nor-androstane-3α,17β-diol. |
| The 3-tetrahydropyranylether of 2β-chloro-androstan-3α-ol-17-one. | The 3-tetrahydropyranylether of 2β-chloro-17α-methyl-androstane-3α,17β-diol. |
| The 3-tetrahydropyranylether of 2β-chloro-19-nor-androstan-3α-ol-17-one. | The 3-tetrahydropyranylether of 2β-chloro-17α-methyl-19-nor-androstane-3α,17β-diol. |
| The 3-tetrahydropyranylether of 2β-bromo-androstan-3α-ol-17-one. | The 3-tetrahydropyranylether of 2β-bromo-17α-methyl-androstane-3α,17β-diol. |
| The 3-tetrahydropyranylether of 2β-bromo-19-nor-androstan-3α-ol-17-one. | The 3-tetrahydropyranylether of 2β-bromo-17α-methyl-19-nor-androstane-3α,17β-diol. |
| The 3-tetrahydropyranylether of 2β-iodo-androstan-3α-ol-17-one. | The 3-tetrahydropyranylether of 2β-iodo-17α-methyl-androstane-3α,17β-diol. |
| The 3-tetrahydropyranylether of 2β-iodo-19-nor-androstan-3α-ol-17-one. | The 3-tetrahydropyranylether of 2β-iodo-17α-methyl-19-nor-androstane-3α,17β-diol. |

Example IX

The 3-tetrahydropyranylether of 2-β-fluoroandrostan-3α-ol-17-one was treated following the procedure described in the foregoing example, but using vinyl magnesium bromide instead of methyl magnesium bromide, thus giving the 3-tetrahydropyranylether of 2β-fluoro-17α-vinyl-androstane-3α,17β-diol.

Using exactly the same conditions were treated the starting compounds listed below, thus yielding the corresponding products hereinafter set forth.

| Starting Compounds | Products |
| --- | --- |
| The 3-tetrahydropyranylether of 2β-fluoro-19-nor-androstan-3α-ol-17-one. | The 3-tetrahydropyranylether of 2β-fluoro-17α-vinyl-19-nor-androstane-3α,17β-diol. |
| The 3-tetrahydropyranylether of 2β-chloro-androstan-3α-ol-17-one. | The 3-tetrahydropyranylether of 2β-chloro-17α-vinyl-androstane-3α,17β-diol. |
| The 3-tetrahydropyranylether of 2β-chloro-19-nor-androstan-3α-ol-17-one. | The 3-tetrahydropyranylether of 2β-chloro-17α-vinyl-19-nor-androstane-3α,17β-diol. |
| The 3-tetrahydropyranylether of 2β-bromo-androstan-3α-ol-17-one. | The 3-tetrahydropyranylether of 2β-bromo-17α-vinyl-androstane-3α,17β-diol. |
| The 3-tetrahydropyranylether of 2β-bromo-19-nor-androstan-3α-ol-17-one. | The 3-tetrahydropyranylether of 2β-bromo-17α-vinyl-19-nor-androstane-3α,17β-diol. |
| The 3-tetrahydropyranylether of 2β-iodo-androstan-3α-ol-17-one. | The 3-tetrahydropyranylether of 2β-iodo-17α-vinyl-androstane-3α,17β-diol. |
| The 3-tetrahydropyranylether of 2β-iodo-19-nor-androstan-3α-ol-17-one. | The 3-tetrahydropyranylether of 2β-iodo-17α-vinyl-19-nor-androstane-3α,17β-diol. |

Example X

The 3-tetrahydropyranylether of 2β-fluoro-androstan-3α-ol-17-one was treated by the technique delineated in Example VIII, except that methylmagnesium bromide was substituted by ethinyl magnesium bromide, thus affording the 3-tetrahydropyranylether of 2β-fluoro-17α-ethinyl androstane-3α,17β-diol.

By the same procedure, the starting compounds under I were converted into the products under II.

| I | II |
| --- | --- |
| The 3-tetrahydropyranylether of 2β-fluoro-19-nor-androstan-3α-ol-17-one. | The 3-tetrahydropyranylether of 2β-fluoro-17α-ethinyl-19-nor-androstane-3α,17β-diol. |
| The 3-tetrahydropyranylether of 2β-chloro-androstan-3α-ol-17-one. | The 3-tetrahydropyranylether of 2β-chloro-17α-ethinyl-androstane-3α,17β-diol. |
| The 3-tetrahydropyranylether of 2β-chloro-19-nor-androstan-3α-ol-17-one. | The 3-tetrahydropyranylether of 2β-chloro-17α-ethinyl-19-nor-androstane-3α,17β-diol. |
| The 3-tetrahydropyranylether of 2β-bromo-androstan-3α-ol-17-one. | The 3-tetrahydropyranylether of 2β-bromo-17α-ethinyl-androstane-3α,17β-diol. |
| The 3-tetrahydropyranylether of 2β-bromo-19-nor-androstan-3α-ol-17-one. | The 3-tetrahydropyranylether of 2β-bromo-17α-ethinyl-19-nor-androstane-3α,17β-diol. |
| The 3-tetrahydropyranylether of 2β-iodo-androstan-3α-ol-17-one. | The 3-tetrahydropyranylether of 2β-iodo-17α-ethinyl-androstane-3α,17β-diol. |
| The 3-tetrahydropyranylether of 2β-iodo-19-nor-androstan-3α-ol-17-one. | The 3-tetrahydropyranylether of 2β-iodo-17α-ethinyl-19-nor-androstane-3α,17β-diol. |

Example XI

A mixture of 1 g. of the 3-tetrahydropyranylether of 2β-fluoro androstane-3α,17β-diol, 4 cc. of pyridine and 2 cc. of acetic anhydride was kept at room temperature overnight, poured into ice water, the formed precipitate was filtered, washed with water and dried. Crystallization from acetone-hexane gave the 3-tetrahydropyranylether of 2β-fluoro-androstane-3α,17β-diol-17-acetate.

Following the above procedure were treated the starting compounds listed below, thus producing the hereinafter disclosed products.

| Starting Compounds | Products |
| --- | --- |
| The 3-tetrahydropyranylether of 2β-fluoro-19-nor-androstane-3α,17β-diol. | The 3-tetrahydropyranylether of 2β-fluoro-19-nor-androstane-3α,17β-diol-17-acetate. |
| The 3-tetrahydropyranylether of 2β-chloro-androstane-3α,17β-diol. | The 3-tetrahydropyranylether of 2β-chloro-androstane-3α,17β-diol-17-acetate. |
| The 3-tetrahydropyranylether of 2β-chloro-19-nor-androstane-3α,17β-diol. | The 3-tetrahydropyranylether of 2β-chloro-19-nor-androstane-3α,17β-diol-17-acetate. |
| The 3-tetrahydropyranylether of 2β-bromo-androstane-3α,17β-diol. | The 3-tetrahydropyranylether of 2β-bromo-androstane-3α,17β-diol-17-acetate. |
| The 3-tetrahydropyranylether of 2β-bromo-19-nor-androstane-3α,17β-diol. | 3-tetrahydropyranylether of 2β-bromo-19-nor-androstane-3α,17β-diol-17-acetate. |
| The 3-tetrahydropyranylether of 2β-iodo-androstane-3α,17β-diol. | The 3-tetrahydropyranylether of 2β-iodo-androstane-3α,17β-diol-17-acetate. |
| The 3-tetrahydropyranylether of 2β-iodo-19-nor-androstane-3α,17β-diol. | The 3-tetrahydropyranylether of 2β-iodo-19-nor-androstane-3α,17β-diol-17-acetate. |

Example XII

To a solution of 5 g. of the 3-tetrahydropyranylether of 2β-fluoro-17α-methyl-androstane-3α,17β-diol in 100 cc. of anhydrous benzene there were added 0.5 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 2β-fluoro - 17α - methyl-androstane-3α,17β-diol-diacetate.

The starting compounds under I were treated following the same procedure, to produce the corresponding products under II.

| I | II |
| --- | --- |
| The 3-tetrahydropyranyl-ether of 2β-fluoro-17α-methyl-19-nor-androstane-3α,17β-diol. | 2β-fluoro-17α-methyl-19-nor androstane-3α,17β-diol-diacetate. |
| The 3-tetrahydropyranyl-ether of 2β-chloro-17α-methyl-androstane-3α,17β-diol. | 2β-chloro-17α-methyl-androstane-3α,17β-diol-diacetate. |
| The 3-tetrahydropyranyl-ether of 2β-chloro-17α-methyl-19-nor-androstane-3α,17β-diol. | 2β-chloro-17α-methyl-19-nor-androstane-3α,17β-diol-diacetate. |

| I | II |
|---|---|
| The 3-tetrahydropyranyl-ether of 2β-bromo-17α-methyl-androstane-3α,17β-diol. | 2β-bromo-17α-methyl-androstane-3α,17β-diol-diacetate. |
| The 3-tetrahydropyranyl-ether of 2β-bromo-17α-methyl-19-nor-androstane-3α,17β-diol. | 2β-bromo-17α-methyl-19-nor-androstane-3α,17β-diol-diacetate. |
| The 3-tetrahydropyranyl-ether of 2β-iodo-17α-methyl-androstane-3α,17β-diol. | 2β-iodo-17α-methyl-androstane-3α,17β-diol-diacetate. |
| The 3-tetrahydropyranyl-ether of 2β-iodo-17α-methyl-19-nor-androstane-3α,17β-diol. | 2β-iodo-17α-methyl-19-nor-androstane-3α,17β-diol-diacetate. |
| The 3-tetrahydropyranyl-ether of 2β-fluoro-17α-vinyl-androstane-3α,17β-diol. | 2β-fluoro-17α-vinyl-androstane-3α,17β-diol-diacetate. |
| The 3-tetrahydropyranylether of 2β-fluoro-17α-vinyl-19-nor-androstane-3α,17β-diol. | 2β-fluoro-17α-vinyl-19-nor-androstane-3α,17β-diol-diacetate. |
| The 3-tetrahydropyranyl-ether of 2β-chloro-17α-vinyl-androstane-3α,17β-diol. | 2β-chloro-17α-vinyl-androstane-3α,17β-diol-diacetate. |
| The 3-tetrahydropyranyl-ether of 2β-chloro-17α-vinyl-19-nor-androstane-3α,17β-diol. | 2β-chloro-17α-vinyl-19-nor-androstane-3α,17β-diol-diacetate. |
| The 3-tetrahydropyranyl-ether of 2β-bromo-17α-vinyl-androstane-3α,17β-diol. | 2β-bromo-17α-vinyl-androstane-3α,17β-diol-diacetate. |
| The 3-tetrahydropyranyl-ether of 2β-bromo-17α-vinyl-19-nor-androstane-3α,17β-diol. | 2β-bromo-17α-vinyl-19-nor-androstane-3α,17β-diol-diacetate. |
| The 3-tetrahydropyranyl-ether of 2β-iodo-17α-vinyl-androstane-3α,17β-diol. | 2β-iodo-17α-vinyl-androstane-3α,17β-diol-diacetate. |
| The 3-tetrahydropyranyl-ether of 2β-iodo-17α-vinyl-19-nor-androstane-3α,17β-diol. | 2β-iodo-17α-vinyl-19-nor-androstane-3α,17β-diol-diacetate. |
| The 3-tetrahydropyranylether of 2β-fluoro-17α-ethinylandrostane-3α,17β-diol. | 2β-fluoro-17α-ethinylandrostane-3α,17β-dioldiacetate. |
| The 3-tetrahydropyranylether of 2β-fluoro-17α-ethinyl-19-nor-androstane-3α,17β-diol. | 2β-fluoro-17α-ethinyl-19-norandrostane-3α,17β-dioldiacetate. |
| The 3-tetrahydropyranylether of 2β-chloro-17α-ethinylandrostane-3α,17β-diol. | 2β-chloro-17α-ethinylandrostane-3α,17β-dioldiacetate. |
| The 3-tetrahydropyranylether of 2β-chloro-17α-ethinyl-19-nor-androstane-3α,17β-diol. | 2β-chloro-17α-ethinyl-19-nor-androstane-3α,17β-dioldiacetate. |
| The 3-tetrahydropyranylether of 2β-bromo-17α-ethinylandrostane-3α,17β-diol. | 2β-bromo-17α-ethinylandrostane-3α,17β-dioldiacetate. |
| The 3-tetrahydropyranylether of 2β-bromo-17α-ethinyl-19-nor-androstane-3α,17β-diol. | 2β-bromo-17α-ethinyl-19-nor-androstane-3α,17β-dioldiacetate. |
| The 3-tetrahydropyranylether of 2β-iodo-17α-ethinylandrostane-3α,17β-diol. | 2β-iodo-17α-ethinyl-androstane-3α,17β-dioldiacetate. |
| The 3-tetrahydropyranylether of 2β-iodo-17α-ethinyl-19-nor-androstane-3α,17β-diol. | 2β-iodo-17α-ethinyl-19-nor-androstane-3α,17β-dioldiacetate. |

*Example XIII*

To a solution of 1 g. of the 3-tetrahydropyranylether of 2β-fluoro-androstane-3α,17β-diol 17 acetate in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded 2β-fluoro-androstane-3α,17β-diol-17-acetate.

Following the above procedure were treated the starting compounds listed below, thus affording the products disclosed hereinafter.

| Starting Compounds | Products |
|---|---|
| The 3-tetrahydropyranylether of 2β-fluoro-19-nor-androstane-3α,17β-diol-17-acetate. | 2β-fluoro-19-nor-androstane-3α,17β-diol-17-acetate. |
| The 3-tetrahydropyranylether of 2β-chloro-androstane-3α,17β-diol-17-acetate. | 2β-chloro-androstane-3α,17β-diol-17-acetate. |
| The 3-tetrahydropyranylether of 2β-chloro-19-nor-androstane-3α,17β-diol-17-acetate. | 2β-chloro-19-nor-androstane-3α,17β-diol-17-acetate. |
| The 3-tetrahydropyranylether of 2β-bromo-androstane-3α,17β-diol-17-acetate. | 2β-bromo-androstane-3α,17β-diol-17-acetate. |
| The 3-tetrahydropyranylether of 2β-bromo-19-nor-androstane-3α,17β-diol-17-acetate. | 2β-bromo-19-nor-androstane-3α,17β-diol-17-acetate. |
| The 3-tetrahydropyranylether of 2β-iodo-androstane-3α,17β-diol-17-acetate. | 2β-iodo-androstane-3α,17β-diol-17-acetate. |
| The 3-tetrahydropyranylether of 2β-iodo-19-nor-androstane-3α-17β-diol-17-acetate. | 2β-iodo-19-nor-androstane-3α,17β-diol-17-acetate. |

A suspension of 1 g. of 2β-fluoro-17α-methylandrostane-3α,17β-diol-diacetate in 60 cc. of methanol was treated with a solution of 0.5 g. of potassium carbonate in 6 cc. of water; the mixture was boiled under reflux for 1 hour and then cooled in ice and diluted with water. The formed precipitate was collected and recrystallized from acetone-hexane to yield 2β-fluoro-17α-methyl-androstane-3α,17β-diol-17-acetate.

By the same procedure the compounds under I were converted into the products under II.

| I | II |
|---|---|
| 2β-fluoro-17α-methyl-19-nor-androstane-3α,17β-diol-diacetate. | 2β-fluoro-17α-methyl-19-nor-androstane-3α,17β-diol-17-acetate. |
| 2β-chloro-17α-methyl-androstane-3α,17β-diol-diacetate. | 2β-chloro-17α-methyl-androstane-3α,17β-diol-17-acetate. |
| 2β-chloro-17α-methyl-19-nor-androstane-3α,17β-diol-diacetate. | 2β-chloro-17α-methyl-19-nor-androstane-3α,17β-diol-17-acetate. |
| 2β-bromo-17α-methyl-androstane-3α,17β-diol-diacetate. | 2β-bromo-17α-methyl-androstane-3α,17β-diol-17-acetate. |
| 2β-bromo-17α-methyl-19-nor-androstane-3α,17β-diol-diacetate. | 2β-bromo-17α-methyl-19-nor-androstane-3α,17β-diol-17-acetate. |
| 2β-iodo-17α-methyl-androstane-3α,17β-diol-diacetate. | 2β-iodo-17α-methyl-androstane-3α,17β-diol-17-acetate. |
| 2β-iodo-17α-methyl-19-nor-androstane-3α,17β-diol-diacetate. | 2β-iodo-17α-methyl-19-nor-androstane-3α,17β-diol-17-acetate. |
| 2β-fluoro-17α-vinyl-androstane-3α,17β-diol-diacetate. | 2β-fluoro-17α-vinyl-androstane-3α,17β-diol-17-acetate. |
| 2β-fluoro-17α-vinyl-19-nor-androstane-3α,17β-diol-diacetate. | 2β-fluoro-17α-vinyl-19-nor-androstane-3α,17β-diol-17-acetate. |
| 2β-chloro-17α-vinyl-androstane-3α,17β-diol-diacetate. | 2β-chloro-17α-vinyl-androstane-3α,17β-diol-17-acetate. |
| 2β-chloro-17α-vinyl-19-nor-androstane-3α,17β-diol-diacetate. | 2β-chloro-17α-vinyl-19-nor-androstane-3α,17β-diol-17-acetate. |
| 2β-bromo-17α-vinyl-androstane-3α,17β-diol-diacetate. | 2β-bromo-17α-vinyl-androstane-3α,17β-diol-17-acetate. |
| 2β-bromo-17α-vinyl-19-nor androstane-3α,17β-diol-diacetate. | 2β-bromo-17α-vinyl-19-nor-androstane-3α,17β-diol-17-acetate. |
| 2β-iodo-17α-vinyl-androstane-3α,17β-diol-diacetate. | 2β-iodo-17α-vinyl-androstane-3α,17β-diol-17-acetate. |
| 2β-iodo-17α-vinyl-19-nor-androstane-3α,17β-diol diacetate. | 2β-iodo-17α-vinyl-19-nor-androstane-3α,17β-diol-17-acetate. |
| 2β-fluoro-17α-ethinyl-androstane-3α,17β-diol diacetate. | 2β-fluoro-17α-ethinyl-androstane-3α,17β-diol-17-acetate. |
| 2β-fluoro-17α-ethinyl-19-nor-androstane-3α,17β-diol-diacetate. | 2β-fluoro-17α-ethinyl-19-nor-androstane-3α,17β-diol-17-acetate. |
| 2β-chloro-17α-ethinyl-androstane-3α,17β-diol diacetate. | 2β-chloro-17α-ethinyl-androstane-3α,17β-diol-17-acetate. |
| 2β-chloro-17α-ethinyl-19-nor-androstane-3α,17β-diol-diacetate. | 2β-chloro-17α-ethinyl-19-nor-androstane-3α,17β-diol-17-acetate. |
| 2β-bromo-17α-ethinyl-androstane-3α,17β-diol diacetate. | 2β-bromo-17α-ethinyl-androstane-3α,17β-diol-17-acetate. |
| 2β-bromo-17α-ethinyl-19-nor-androstane-3α,17β-diol-diacetate. | 2β-bromo-17α-ethinyl-19-nor-androstane-3α,17β-diol-17-acetate. |
| 2β-iodo-17α-ethinyl-androstane-3α,17β-diol-diacetate. | 2β-iodo-17α-ethinyl-androstane-3α,17β-diol-17-acetate. |
| 2β-iodo-17α-ethinyl-19-nor-androstane-3α,17β-diol diacetate. | 2β-iodo-17α-ethinyl-19-nor-androstane-3α,17β-diol-17-acetate. |

*Example XIV*

A solution of 1 g. of 2β-fluoro-androstane-3α,17β-diol-17-acetate in 50 cc. of tetrahydrofuran was added over a 5 minute period to a stirred suspension of 1 g. of lithium aluminum hydride in 50 cc. of anhydrous tetrahydrofuran. The mixture was further stirred for 5 minutes, then cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 2β-fluoro-androstane-3α,17β-diol.

When applying the above procedure to the compounds produced in the foregoing example, there were respectively obtained the following products:

2β-fluoro-19-nor-androstane-3α,17β-diol,
2β-chloro-androstane-3α,17β-diol,
2β-chloro-19-nor-androstane-3α,17β-diol,
2β-bromo-androstane-3α,17β-diol,
2β-bromo-19-nor-androstane-3α,17β-diol,
2β-iodo-androstane-3α,17β-diol,
2β-iodo-19-nor-androstane-3α,17β-diol, 2β-fluoro-17α-methyl-androstane-3α,17β-diol,
2β-fluoro-17α-methyl-19-nor-androstane-3α,17β-diol,
2β-chloro-17α-methyl-androstane-3α,17β-diol,
2β-chloro-17α-methyl-19-nor-androstane-3α,17β-diol,
2β-bromo-17α-methyl-androstane-3α,17β-diol,
2β-bromo-17α-methyl-19-nor-androstane-3α,17β-diol,
2β-iodo-17α-methyl-androstane-3α,17β-diol,
2β-iodo-17α-methyl-19-nor-androstane-3α,17β-diol,
2β-fluoro-17α-vinyl-androstane-3α,17β-diol,
2β-fluoro-17α-vinyl-19-nor-androstane-3α,17β-diol,
2β-chloro-17α-vinyl-androstane-3α,17β-diol,
2β-chloro-17α-vinyl-19-nor-androstane-3α,17β-diol,
2β-bromo-17α-vinyl-androstane-3α,17β-diol,
2β-bromo-17α-vinyl-19-nor-androstane-3α,17β-diol,
2β-iodo-17α-vinyl-androstane-3α,17β-diol,
2β-iodo-17α-vinyl-19-nor-androstane-3α,17β-diol,
2β-fluoro-17α-ethinyl-androstane-3α,17β-diol,
2β-fluoro-17α-ethinyl-19-nor-androstane-3α,17β-diol,
2β-chloro-17α-ethinyl-androstane-3α,17β-diol,
2β-chloro-17α-ethinyl-19-nor-androstane-3α,17β-diol,
2β-bromo-17α-ethinyl-androstane-3α,17β-diol,
2β-bromo-17α-ethinyl-19-nor-androstane-3α,17β-diol,
2β-iodo-17α-ethinyl-androstane-3α,17β-diol,
2β-iodo-17α-ethinyl-19-nor-androstane-3α,17β-diol.

*Example XV*

A mixture of 1 g. of 2β-fluoro-androstane-3α,17β-diol-17-acetate 4 cc. of pyridine and 2 cc. of caproic anhydride was kept at room temperature overnight, poured into ice water, the formed precipitate was filtered, washed with water and dried. Crystallization from acetone-hexane gave 2β-fluoro-androstane-3α,17β-diol-3-caproate-17-acetate.

By the same procedure the compounds obtained in Example 13 were converted into the following products:

2β - fluoro - 19-nor-androstane-3α,17β-diol-caproate-17-acetate,
2β - chloro-androstane-3α,17β-diol-3-caproate-17-acetate,
2β - chloro-19-nor-androstane-3α,17β-diol-3-caproate-17-acetate,
2β - bromo-androstane-3α,17β-diol-3-caproate-17-acetate,
2β - bromo-19-nor-androstane-3α,17β-diol-3-caproate-17-acetate,
2β - iodo-androstane-3α,17β-diol-3-caproate-17-acetate,
2β - iodo - 19-nor-androstane-3α,17β-diol-3-caproate-17-acetate,
2β - fluoro-17α-methyl-androstane-3α,17β-diol-3-caproate-17-acetate,
2β - fluoro - 17α-methyl-19-nor-androstane-3α,17β-diol-3-caproate-17-acetate,
2β - chloro-17α-methyl-androstane-3α,17β-diol-3-caproate-17-acetate,
2β - chloro - 17α-methyl-19-nor-androstane-3α,17β-diol-3-caproate-17-acetate,
2β - bromo-17α-methyl-androstane-3α,17β-diol-3-caproate-17-acetate,
2β - bromo - 17α-methyl-19-nor-androstane-3α,17β-diol-3-caproate-17-acetate,
2β - iodo-17α-methyl-androstane-3α,17β-diol-3-caproate-17-acetate,
2β - iodo-17α-methyl-19-nor-androstane-3α,17β-diol-3-caproate-17-acetate,
2β - fluoro - 17α-vinyl-androstane-3α,17β-diol-3-caproate-17-acetate,
2β - fluoro-17α-vinyl-19-nor androstane-3α,17β-diol-3-caproate-17-acetate,
2β - chloro-17α-vinyl-androstane-3α,17β-diol-3-caproate-17-acetate,
2β - chloro-17α-vinyl-19-nor-androstane-3α,17β-diol-3-caproate-17-acetate,
2β - bromo-17α-vinyl-androstane-3α,17β-diol-3-caproate-17-acetate,
2β - bromo-17α-vinyl-19-nor-androstane-3α,17β-diol-3-caproate-17-acetate,
2β - iodo-17α-vinyl-androstane-3α,17β-diol-3-caproate-17-acetate,
2β - iodo-17α-vinyl-19-nor-androstane-3α,17β-diol-3-caproate-17-acetate,
2β - fluoro-17α-ethinyl-androstane-3α,17β-diol-3-caproate-17-acetate,
2β - fluoro-17α-ethinyl-19-nor-androstane-3α,17β-diol-3-caproate-17-acetate,
2β - chloro-17α-ethinyl-androstane-3α,17β-diol-3-caproate-17-acetate,
2β - chloro-17α-ethinyl-19-nor-androstane-3α,17β-diol-3-caproate-17-acetate,
2β - bromo - 17α-ethinyl-androstane-3α,17β-diol-3-caproate-17-acetate,
2β - bromo-17α-ethinyl-19-nor-androstane-3α,17β-diol-3-caproate-17-acetate,
2β - iodo-17α-ethinyl-androstane-3α,17β-diol-3-caproate-17-acetate,
2β - iodo - 17α-ethinyl-19-nor-androstane-3α,17β-diol-3-caproate-17-acetate.

*Example XVI*

A mixture of 1 g. of 2β-fluoro-androstane-3α,17β-diol 4 cc. of pyridine and 2 cc. of propionic anhydride was kept at room temperautre overnight, poured into ice water, the formed precipitate was filtered, washed with water and dried. Crystallization from acetone-hexane gave 2β-fluoro-androstane-3α,17β-diol-dipropionate.

By the same procedure the starting compounds under I were converted into the products under II.

| I | II |
|---|---|
| 2β-fluoro-19-nor-androstane-3α, 17β-diol. | 2β-fluoro-19-nor-androstane-3α, 17β-diol-dipropionate. |
| 2β-chloro-androstane-3α,17β-diol | 2β-chloro-androstane-3α,17β-diol-dipropionate. |
| 2β-chloro-19-nor-androstane-3α, 17β-diol. | 2β-chloro-19-nor-androstane-3α, 17β-diol-dipropionate. |
| 2β-bromo-androstane-3α,17β-diol | 2β-bromo-androstane-3α,17β-diol-dipropionate. |
| 2β-bromo-19-nor-androstane-3α, 17β-diol. | 2β-bromo-19-nor-androstane-3α, 17β-diol-dipropionate. |
| 2β-iodo-androstane-3α,17β-diol | 2β-iodo-androstane-3α,17β-diol-dipropionate. |
| 2β-iodo-19-nor-androstane-3α, 17β-diol. | 2β-iodo-19-nor-androstane-3α, 17β-diol-dipropionate. |

*Example XVII*

The starting compounds of the foregoing example were treated following the procedure described in the same example except that propionic anhydride was substituted by cyclopentylpropionic anhydride, enanthic anhydride and undecanoic anhydride, thus yielding respectively the di-cyclopentylpropionates, di-enanthates and di-undecanoates of said compounds.

*Example XVIII*

To a solution of 5 g. of 2β-fluoro-17α-methyl-androstane-3α,17β-diol in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue form ether-hexane produced 2β-fluoro-17α-methyl-androstane-3α,17β-diol-dipropionate.

By the same technique were treated the starting compounds listed below, to produce the corresponding products hereinafter disclosed:

| Starting compound | Product |
|---|---|
| 2β-fluoro-17α-methyl-19 nor-androstane-3α,17β-diol. | The dipropionate of 2β-fluoro-17α-methyl-19-nor-androstane-3α,17β-diol. |
| 2β-chloro-17α-methyl-androstane-3α,17β-diol. | The dipropionate of 2β-chloro-17α-methyl-androstane-3α,17β-diol. |
| 2β-chloro-17α-methyl-19-nor-androstane-3α,17β-diol. | The dipropionate of 2β-chloro-17α-methyl-19-nor-androstane-3α,17β-diol. |
| 2β-bromo-17α-methyl-androstane-3α,17β-diol. | The dipropionate of 2β-bromo-17α-methyl-androstane-3α-17β-diol. |
| 2β-bromo-17α-methyl-19-nor-androstane-3α,17β-diol. | The dipropionate of 2β-bromo-17α-methyl-19-nor-androstane-3α,17β-diol. |
| 2β-iodo-17α-methyl-androstane-3α,17β-diol. | The dipropionate of 2β-iodo-17α-methyl-androstane-3α,17β-diol. |
| 2β-iodo-17α-methyl-19-nor-androstane-3α,17β-diol. | The diproprionate of 2β-iodo-17α-methyl-19-nor-androstane-3α,17β-diol. |
| 2β-fluoro-17α-vinyl-androstane-3α-17β-diol. | The diprorpionate of 2β-fluoro-17α-vinyl-androstane-3α,17β-diol. |
| 2β-fluoro-17α-vinyl-19-nor-androstane-3α,17β-diol. | The diproprionate of 2β-fluoro-17α-vinyl-19-nor-androstane-3α,17β-diol. |
| 2β-chloro-17α-vinyl-androstane-3α,17β-diol. | The diproprionate of 2β-chloro-17α-vinyl-androstane-3α,17β-diol. |
| 2β-chloro-17α-vinyl-19-nor-androstane-3α,17β-diol. | The diproprionate of 2β-chloro-17α-vinyl-19-nor-androstane-3α,17β-diol. |
| 2β-bromo-17α-vinyl-androstane-3α,17β-diol. | The diproprionate of 2β-bromo-17α-vinyl-androstane-3α,17β-diol. |
| 2β-bromo-17α-vinyl-19-nor-androstane-3α,17β-diol. | The diproprionate of 2β-bromo-17α-vinyl-19-nor-androstane-3α,17β-diol. |
| 2β-iodo-17α-vinyl-androstane-3α,17β-diol. | The diprorpionate of 2β-iodo-17α-vinyl-androstane-3α,17β-diol. |
| 2β-iodo-17α-vinyl-19-nor-androstane-3α,17β-diol. | The diproprionate of 2β-iodo-17α-vinyl-19-nor-androstane-3α,17β-diol. |
| 2β-fluoro-17α-ethinyl-androstane-3α,17β-diol. | The dipropionate of 2β-fluoro-17α-ethinyl-androstane-3α,17β-diol. |
| 2β-fluoro-17α-ethinyl-19-nor-androstane-3α,17β-diol. | The dipropionate of 2β-fluoro-17α-ethinyl-19-nor-androstane-3α,17β-diol. |
| 2β-chloro-17α-ethinyl-androstane-3α,17β-diol. | The dipropionate of 2β-chloro-17α-ethinyl-androstane-3α,17β-diol. |
| 2β-chloro-17α-ethinyl-19-nor-androstane-3α,17β-diol. | The dipropionate of 2β-chloro-17α-ethinyl-19-nor-androstane-3α,17β-diol. |
| 2β-bromo-17α-ethinyl-androstane-3α,17β-diol. | The dipropionate of 2β-bromo-17α-ethinyl-androstane-3α,17β-diol. |
| 2β-bromo-17α-ethinyl-19-nor-androstane-3α,17β-diol. | The dipropionate of 2β-bromo-17α-ethinyl-19-nor-androstane-3α,17β-diol. |
| 2β-iodo-17α-ethinyl-androstane-3α,17β-diol. | The dipropionate of 2β-iodo-17α-ethinyl-androstane-3α,17β-diol. |
| 2β-iodo-17α-ethinyl-19-nor-androstane-3α,17β-diol. | The dipropionate of 2β-iodo-17α-ethinyl-19-nor-androstane-3α,17β-diol. |

*Example XIX*

Following the procedure described in the preceding example, except that propionic anhydride was substituted by enanthic anhydride and cyclopentylpropionic anhydride, the starting compounds mentioned in the same example, were converted into their respective di-enanthates and di-cyclopentylpropionates.

*Example XX*

A mixture of 1 g. of 2β-fluoro-androstan-3α-ol-17-one 4 cc. of pyridine and 2 cc. of acetic anhydride was kept at room temperature overnight, poured into ice water, the formed precipitate was filtered, washed with water and dried. Crystallization from acetone-hexane gave the acetate of 2β-fluoro-androstan-3α-ol-17-one.

By the same procedure the starting compounds under I were converted into the products under II.

| I | II |
|---|---|
| 2β-fluoro-19-nor-androstan-3α-ol-17-one. | The acetate of 2β-fluoro-19-nor-androstan-3α-ol-17-one. |
| 2β-chloro-androstan-3α-,-ol-17-one. | The acetate of 2β-chloro-androstan-3α,-ol-17-one. |
| 2β-chloro-19-nor-androstan-3α-ol-17-one. | The acetate of 2β-chloro-19-nor-androstan-3α-ol-17-one. |
| 2β-bromo-androstan-3α,-ol-17-one. | The acetate of 2β-bromo-androstan-3α-ol-17-one. |
| 2β-bromo-19-nor-androstan-3α-ol-17-one. | The acetate of 2β-bromo-19-nor-androstan-3α-ol-17-one. |
| 2β-iodo-androstan-3α-ol-17-one. | The acetate of 2β-iodo-androstan-3α-ol-17-one. |
| 2β-iodo-19-nor-androstan-3α-ol-17-one. | The acetate of 2β-iodo-19-nor-androstan-3α-ol-17-one. |

*Example XXI*

The starting compounds mentioned in the foregoing example were treated by the procedure described in the same example, except that acetic anhydride was substituted by propionic anhydride, caproic anhydride and enanthic anhydride thus furnishing the corresponding propionates, caproates and enanthates.

We claim:
1. A compound of the following formula:

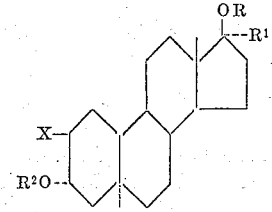

wherein R¹ is lower alkenyl; R and R² are selected from the group consisting of hydrogen and a hydrocarbon carboxylic acyl group of less than 12 carbon atoms; and X is a halogen atom.
2. 2β-fluoro-17α-vinyl-19-nor-androstane-3α,17β-diol.
3. 2β-chloro-17α-vinyl-19-nor-androstane-3α,17β-diol.

References Cited in the file of this patent
UNITED STATES PATENTS

| 2,833,794 | Goldkamp et al. | May 6, 1958 |
| 3,009,934 | Counsell et al. | Nov. 21, 1961 |